(12) United States Patent
Kalvin

(10) Patent No.: US 6,292,578 B1
(45) Date of Patent: Sep. 18, 2001

(54) SYSTEM AND METHOD FOR RESTORING, DESCRIBING AND GRAPHICALLY DISPLAYING NOISE-CORRUPTED BOUNDARIES IN TOMOGRAPHY IMAGES

(75) Inventor: Alan David Kalvin, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/632,620

(22) Filed: Aug. 4, 2000

Related U.S. Application Data

(63) Continuation of application No. 09/025,675, filed on Feb. 18, 1998.

(51) Int. Cl.[7] .............................. G06K 9/00; G06K 9/42; A61B 6/00

(52) U.S. Cl. ............................... 382/131; 382/256; 378/4

(58) Field of Search .................................... 382/128, 131, 382/132, 199, 256; 378/4, 11, 21, 25, 26, 27; 250/363.04; 707/521

(56) References Cited

U.S. PATENT DOCUMENTS

| | | | |
|---|---|---|---|
| 4,888,693 | 12/1989 | Tam | 378/4 |
| 4,920,491 * | 4/1990 | Eberhard et al. | 382/131 |
| 5,421,330 | 6/1995 | Thirion et al. | 600/425 |
| 5,640,436 * | 6/1997 | Kawai et al. | 378/4 |
| 5,647,018 | 7/1997 | Benjamin | 382/128 |
| 5,739,539 * | 4/1998 | Wang et al. | 250/363.04 |
| 5,740,224 | 4/1998 | Muller et al. | 378/11 |
| 5,754,618 | 5/1998 | Okamoto et al. | 378/4 |
| 5,761,333 | 6/1998 | Hsieh et al. | 382/131 |
| 5,859,891 * | 1/1999 | Hibbard | 378/62 |
| 5,933,471 | 8/1999 | Kalvin | 378/4 |
| 6,026,142 * | 2/2000 | Gueziec et al. | 378/8 |
| 6,078,680 * | 6/2000 | Yoshida et al. | 382/128 |

OTHER PUBLICATIONS

Ge Wang et al., "Interactive Deblurring for CT Metal Artifact Reduction", IEEE Trans, of Medical Imaging, IEEE Trans, of Medical Imaging, vol. 15, No. 5, Oct. 1996.

N. Srinivasa et al., "Detection f Edges from Projections" IEEE 1992, pp. 76–80.

Spetsieris et al., "Visuo–Computational Tools for PET Physiological Imaging", IEEE Conference on Nuclear Science Symposium and Medical Imaging; ISBN: 0–7803–0513–2, vol. 3, pp. 2149–2153.

G. H. Glover and N. J. Pelc, "An algorithm for the reduction of metal clip artifacts in CT reconstruction", *Medical Physics*, vol. 8, No. 6, Dec. 1981, pp. 799–807.

(List continued on next page.)

Primary Examiner—Amelia M. Au
Assistant Examiner—Mehrdad Dastouri
(74) Attorney, Agent, or Firm—McGuireWoods, LLP; Louis J. Percello

(57) ABSTRACT

Noise-corrupted boundary information in tomographic images is restored using a data structure, called a "boundary envelope". Both the restored boundary information and a measure of the precision of the restoration are described by the process. This data structure is used to describe the restored information in both qualitative and quantitative terms. The results of the boundary restoration process are described qualitatively by graphically displaying the boundary envelope together with the noisy CT image in such a way that allows a human observer to (a) see more details of the boundary than are visible in the CT image alone, and (b) to visually apprehend the precision with which the boundary has been restored. A boundary envelope describes a region in the image within which the boundary of a given noisy object is guaranteed to lie. The boundary envelope describes a set of limits on the object boundary, and limits on those properties of a noisy object that can be computed from boundary information.

23 Claims, 11 Drawing Sheets

OTHER PUBLICATIONS

H. K. Tuy, "An algorithm to reduce clip artifacts in CT images", *SPIE*, vol. 1652 Medical Image Processing, 1992, pp.635–643.

T. Hinderling, P. Rüegsegger, M. Anliker and C. Dietschi, "Computed tomograpy reconstruction from hollow projections, and application to *In Vivo* evaluation of artificial hip joints", *Journal of Computer Assisted Tomography,* vol. 3, No. 1, 1979, pp. 52–57.

W. A. Kalender, R. Hebel and J. Ebersberger, "Reduction of CT artifacts caused by metallic implants", *Radiology,* vol. 164, No. 2, Aug. 1987, pp. 576–577.

E. Klotz, W. Kalender, R. Sokiranski and D. Felsenberg, "Algorithms for the reduction of CT artifacts caused by metallic caused by metallic implants", *SPIE,* vol. 1234, 1990, pp. 642–650.

B. E. Oppenheim, "Reconstruction tomography from incomplete projections", *Reconstruction Tomography in Diagnostic Radiology and nuclear Medicine,* 1977, pp. 155–183.

D. D. Roberetrson, P. J. Weiss, E. K. Fishman, D. Magid and P. S. Walker, "Evaluation of CT techniques for reducing artifacts in the presence of metallic ortopedic implants" *Journal of Computer Assisted Tomography,* vol. 12, No. 2, Mar./Apr. 1988, pp. 236–241.

H. Soltanian–Zadeh, J. P. Windham, J. Soltsiisnzadeh, "CT artifact correction, an image processing approach", PPIE Medical Imaging Contference, Newport Beach, CA, Feb. 1996.

* cited by examiner

SYSTEM AND METHOD FOR RESTORING, DESCRIBING AND GRAPHICALLY DISPLAYING NOISE-CORRUPTED BOUNDARIES IN TOMOGRAPHY IMAGES

This application is a continuation of U.S. patent application Ser. No. 09/025,675, filed Feb. 18, 1998, the contents of which are hereby incorporated by reference.

BACKGROUND OF THE INVENTION

1. Field of the Invention

The present invention generally relates to the field of computer image processing of computer tomography (CT) data and, more particularly to the problem of restoring noise-corrupted boundaries in CT images, and to the characterizing and displaying of this restored boundary information.

2. Background Description

U.S. Pat. No. 5,416,815, which is incorporated herein by reference in its entirety, describes computer tomography (CT) systems and the method of image reconstruction from projections.

Computed tomography images are created from projection data by a process known as "image reconstruction from projections". If the projection data are corrupted by noise, the reconstructed images will in turn be corrupted by noise. The artifacts in the images resulting from this noise are known as "reconstruction artifacts".

For example, in X-ray CT imaging, a significant amount of noise can be introduced into the projection data when the objects being scanned contain metal. The reconstruction artifacts manifest in the form of blooming and streaking artifacts that radiate from he regions of the image where the metal is present.

These artifacts (known as "metal-induced" reconstruction artifacts) produce severe corruption especially at the boundaries of objects in the images. This significantly limits the clinical usefulness of the images, both for diagnostic and therapeutic purposes, since an accurate knowledge about locations of object boundaries is crucial in applications such as computer-assisted surgery, and radiotherapy.

There are two basic approaches to recover information about the corrupted boundaries, a "projection-based" approach, and an "image-based" approach.

In the "projection-based" approach, projection data obtained from the CT scanner are used to recover missing boundary information. The prior art in boundary recovery from projection data includes: m. Bergstrom, J. Litton, L. Eriksson, C. Bohm, and G. Blomqvist, "Determination of Object Contour from Projections for Attenuation Correction in Cranial-Positron Emission Tomography", Journal of Computer Assisted Tomography, April 1982, 6(2), pp. 365–372; Jean-Philippe Thirion and Nicholas Ayache, "Method and device for examining a body, particularly for tomography", U.S. Pat. No. 5,421,330, (1995); N. Srinivasa, K. R. Ramakrishnan, and K. Rajgopal, "Detection of edges from projections", IEEE Trans. Medical Imaging, March 1992, 11(1), pp.76–80; Ralph Benjamin, "Method and apparatus for generating images", U.S. Pat. No. 5,647,018, (1997).

In the "image-based" approach, the noisy CT image is first "cleaned-up" by applying a suitable noise-reduction algorithm. Since this process improves the overall quality of the image, it will improve the quality of the boundaries, which can then be determined with improved precision.

Since the image-based methods are primarily concerned with improving the overall quality of the image, they are not especially well-suited for the specific task of boundary-recovery. Nevertheless, they are included here for the sake of completeness.

In general, the most appropriate noise reduction algorithms to use in the image-based approach are hose algorithms known as "metal artifact reduction" (MAR) methods. The prior art in MAR algorithms includes the following: D. D. Robertson, P. J. Weiss, E. K. Fishman, D. Magid, and P. S. Walker, "Evaluation of CT techniques for reducing artifacts in the presence of metallic orthopedic implants", Journal of Computer Assisted Tomography, March–April 1988, 12(2), pp. 236–41; Hamid Soltanian-Zadeh, Joe P. Windham, and Jalal Soltanianzadeh, "CT Artifact Correction: An Image Processing Approach", SPIE Medical Imaging '96, Newport Beach, Calif. February 1996; Heang K. Tuy, "An Algorithm to Reduce Clip Artifacts in CT Images", SPIE Vol. 1652 Medical Imaging VI: Image processing (1992); G. H. Glover and N. J. Pelc, "An algorithm for the reduction of metal clip artifacts in CT reconstruct ions", Medical Physics, 8(6), November/December 1981, pp. 799–807; T. Hinderling, P. Ruegsegger, M. Anliker, and C. Dietschi, "Computed Tomography reconstruction from hollow projections: an application to in vivo valuation of artificial hip joints", Journal of Computer Assisted Tomography, February 1979, 3(1), pp. 52–57; W. A. Kalender, R. Hebel, and J. Ebersberger, "Reduction of CT artifacts caused by metallic implants", Radiology, August 1987, 164(2), pp. 576–7; E. Klotz, W. A. Kalender, R. Sokiranski, and D. Felsenberg, "Algorithms for the reduction of CT artifacts caused by metallic implants", Medical Imaging IV: PACS System Design and Evaluation, vol. 1234, Newport Beach, Calif. February 1990, pp. 642–650; R. M. Lewitt and B. H. T. Bates, "Image reconstruction from projections: IV: Projection completion methods (computational examples)", Optik 50, 1978, pp. 269–278; B. E. Oppenheim, "Reconstruction tomography from incomplete projections", Reconstruction Tomography in Diagnostic and Nuclear Medicine, Ter-Pogossian (editor), University Park Press, Baltimore, 1977, pp. 155–183; and G. Wang, D. L. Snyder, A. O'Sullivan, and M. W. Vannier, "Iterative deblurring for CT metal artifact reduction", IEEE Trans. Medical Imaging, October 1996, 14(5), pp. 657–664.

The following are the limitations of the prior art. The existing projection-based boundary-recovery methods are designed to work with high-quality projection data, that is projection data that are (i) highly-sampled, (ii) of high-resolution, and (iii) contain an insignificant amount of noise. Unlike the present invention, they are not designed to handle noisy projection data, or sparsely-sampled or low-resolution projection data.

Therefore, these methods are not suitable for embodiment in practical, real-world systems that can be routinely used in hospitals and medical clinics, and that rely only on data that are readily available from standard medical CT scanners.

The image-based methods, as already mentioned, are not especially well-suited for the specific task of boundary-recovery. Since they are not expressly designed to solve this problem.

Definitions

The basic concepts described in the present invention are better understood with review of the following definitions.

PIXEL: A picture element. The basic element in a two-dimensional (2D) digital picture.

IMAGE: A rectangular 2D digital picture. Each pixel in the image is identified by a pair of integers (x,y), where x and y are, respectively, the column and row locations of the pixel. (The terms "slice" and "image" are used interchangeably in describing the present invention).

SLICE: See IMAGE.

IMAGE SEGMENTATION: The process of identifying objects of interest in an image.

EDGE: An edge is a point in an image at the transition between two regions having markedly disparate pixel values.

SEGMENTED OBJECT: A object of interest in an image identified by the process of segmentation.

RAY: This refers to a single X-ray beam that travels from the CT scanner X-ray tube to a detector cell on the CT scanner detector array.

RAYSUM: This refers to the basic unit of projection data collected by a CT scanner. It is the value associated with a single X-ray beam. It is a measure of the total attenuation of the beam ray as it travels from its source through the object being scanned to the CT detector array.

VIEW: A view consists of a complete set of rays produced by a CT scanner with the X-ray tube in a fixed position.

DERIVATIVE PROJECTION DATA: Given a set of projection data P, a derivative set of projection data D is a set of projection data derived from P that has less information content. Typical examples of sets of derivative projection data are sets produced when P is sub-sampled, when its resolution is reduced, or when it is otherwise filtered.

SINOGRAM: In its standard mode of operation, a CT scanner collects a set S of views while the CT table is held in a fixed position. The views in the set S are acquired at different positions of the X-ray tube as it rotates around the table. A sinogram consists of all the projection data, or a derivative thereof, in a single set S of views.

Since each data point in a sinogram corresponds to a single ray traveling from the X-ray source to the detector, a sinogram can be represented as a 2D image, where each pixel is uniquely identified by the ordered pair of integers (r,v) where v is the view containing this ray, and r is the number of the ray within view v. Therefore, the following terms are used interchangeably: sinogram data, projection data, sinogram image, and projection image.

SCOUT IMAGE: A scout image is a 2D digital X-ray produced when a CT machine scans a collection of objects while the X-ray tube is held in a fixed position, and the CT table, together with the objects, is moved.

SUMMARY ON THE INVENTION

It is therefore an object of the present invention to provide a system and method to recover the details of object boundaries in computed tomography images that are corrupted by noise, and in particular in X-ray computer tomography (CT) images that have been corrupted by reconstruction artifacts.

It is another object of the present invention to provide a system and method for determining and describing the constraints on the precision of the recovered boundary information.

It is a further object of the present invention to provide a system and method for graphically displaying the recovered boundary information together with the constraints on the precision of the restored information.

It is yet another object of the present invention to provide a system and method for determining physical properties of the objects in tomographic images from the recovered boundary information.

According to the invention, there is provided a boundary-recovery system that:

uses projection data and tomographic image data to restore noise-corrupted boundaries in tomographic images;

produces a description of the limits of the precision of the restored boundary information;

graphically displays the restored information in a manner that allows a human observer to see the locations of corrupted object boundaries, together with a graphical representation of the limits of precision of the determined boundaries;

computes physical properties of objects in the tomographic images from the restored boundary information and the description of the limits of restoration precision;

is applicable to the processing of not only high-quality sinogram data, but also to the processing of to sparsely-sampled and/or low-resolution projection data, including projection data derived from scout images as well;

is applicable to projection data corrupted by noise of the type that is induced by the scanning of objects made of material (such as steel) that is opaque, or near-opaque to the scanning x-rays;

is applicable to recovering the boundaries of convex objects, and the boundaries of the convex hulls of concave objects (but not the boundaries of the concave objects themselves); and is clinically viable in the sense that this method that can be embodied in a practical, real-world system that can be used routinely in hospitals and medical clinics, and relies only on data that are available from standard medical CT scanners.

More specifically, this invention is a technique for restoring missing boundary information in CT scans of medical patients having implanted metallic prostheses, a method of describing the restored boundary information, a method of graphically displaying the restored boundary information, and a method for computing geometric properties of objects with noisy boundaries in CT images, using the techniques according to the invention.

BRIEF DESCRIPTION OF THE DRAWINGS

The foregoing and other objects, aspects and advantages will be better understood from the following detailed description of a preferred embodiment of the invention with reference to the drawings, in which:

FIGS. 9A, 92 and 9C are diagrams illustrating the process of FIG. 8; and

DETAILED DESCRIPTION OF A PREFERRED EMBODIMENT OF THE INVENTION

Figure 1:
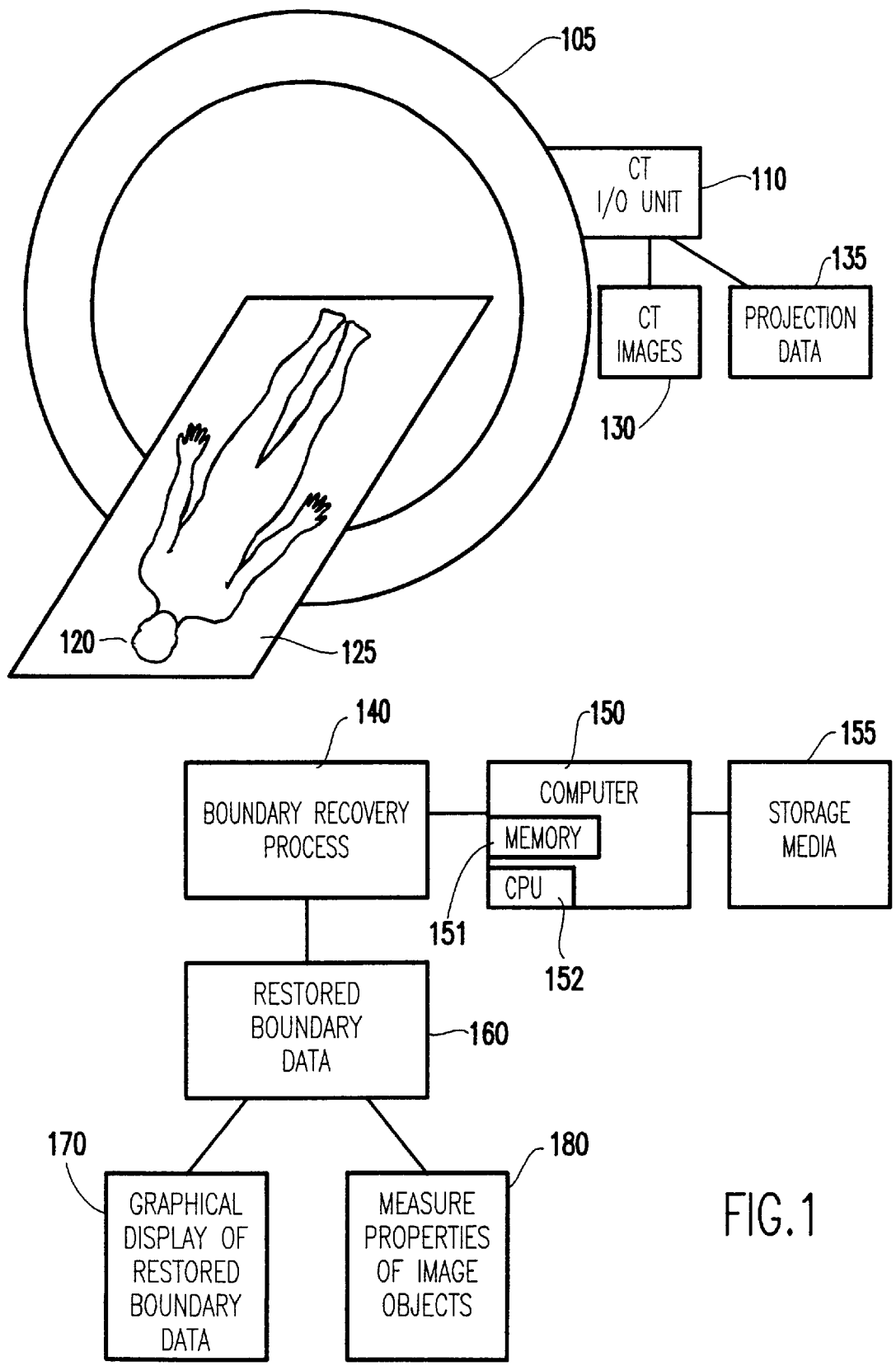
FIG. 1 is a block diagram of a computer tomography (CT) system using the present invention.

Referring now to the drawings, and more particularly to FIG. 1, there is shown one preferred embodiment of the present invention for recovering, describing, and displaying missing boundary information in noise-corrupted computer tomography (CT) images 130 produced by a computed tomography scanner 105 and output via a CT input/output (I/O) unit 110. A patient 120 is scanned by the CT scanner 105, collecting projection data 135, from which is created a set of two-dimensional CT images 130. This process of creating the images 130 is known as image reconstruction from projections. The CT images 130 contain crosssectional details of the scene that was scanned, which typically includes the patient 120.

The CT images 130 and the related CT projection data 135 are input to a computer 150 and, optionally, stored on an external storage medium 155. The computer 150 may be, for example, an IBM RS/6000 workstation running AIX, IBM'S version of the UNIX operating system, and the external storage medium 155 may be, for example, a disk storage system connected to the computer. An boundaryrecovery program 140 running on the computer 150 reads in the CT images 130 and projection data 135, and produces the restored boundary information 160.

The restored boundary information 160 is graphically displayed on a computer monitor 170. Further, this restored boundary information 160 is used by a computer program 180 to measure numerical properties of image objects, for example geometric properties like surface area, boundary perimeter, centroid position, moments and products of inertia, eccentricity, etc.

Figure 2:
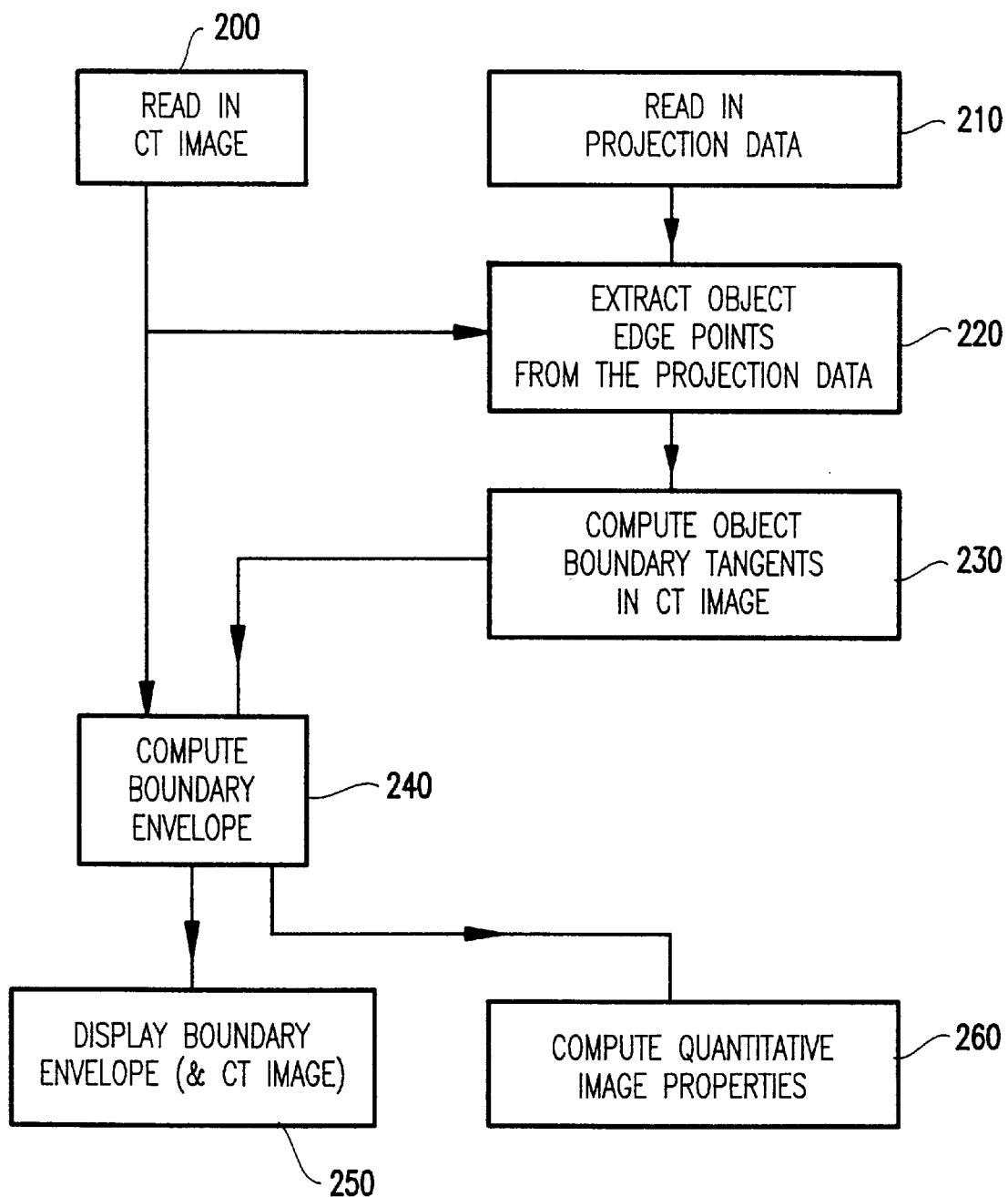
FIG. 2 is a flow chart showing the overalllogic of the computer implemented process according to the invention.

FIG. 2 shows a flow chart of the boundary-recovery program 140 shown in FIG. 1. The CT image is processed as follows. The noisy CT image (input at function block 200), and the noisy sinogram (i.e., projection) data (input at function block 210), are read into the computer. In function block 220, the high contrast sinogram edges are detected.

Each of these high-contrast sinogram edges corresponds to a line in the CT image that is tangent to an object boundary. We know that these correspondences do indeed exist, because of the particular nature of (a) the sinogram data being processed, and (b) the boundaries being restored. That is, the sinogram data are affected by noise that corrupts sinogram pixel values, but not the location of high-contrast sinogram edges. In addition, the boundaries being restored belong to convex objects.

Once the boundary tangents have been computed in function block 230, the boundary envelope (see (definition below) is computed in function block 240. The boundary envelope, which is derived from the tangent data, is a novel feature of this invention. Its function is to describe the limits of the precision with which the missing boundary information can be restored. Once the boundary envelope is computed, it is displayed with the CT image at function block 250, and it is also used to computer quantitative image properties in function block 260.

Figure 3:
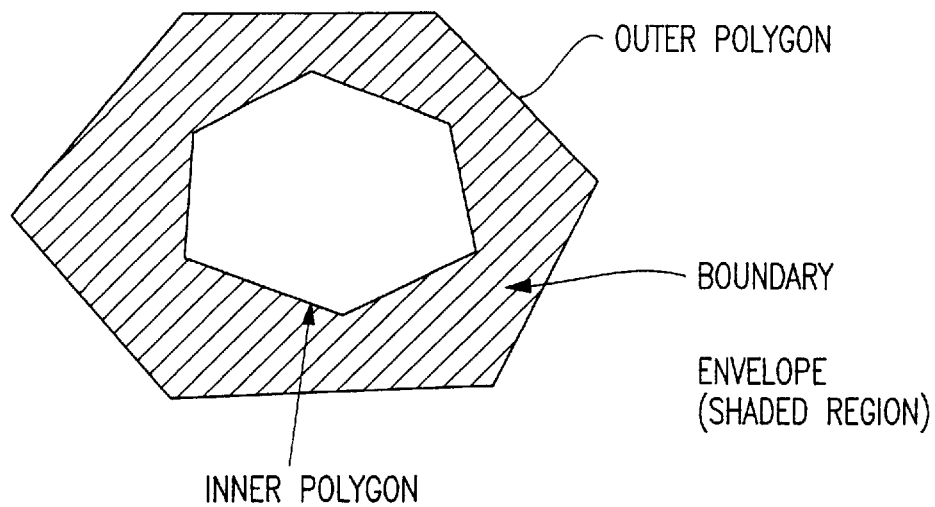
FIG. 3 shows a diagram showing an example of a boundary envelope.

A boundary envelope ($P_{inner}$, $P_{outer}$), is defined to be the region of intersection between the pair of nested, convex polygons $P_{inner}$ and $P_{outer}$. An example of a boundary envelope is shown in FIG. 3. A boundary envelope delimits the region within which a boundary is constrained to lie, and quantifies the degree of precision to which the boundary location can be specified. Given a boundary envelope, we know the region in which the boundary is guaranteed to lie, but we cannot be more precise in specifying the location of the boundary. The two polygons $P_{inner}$ and $P_{outer}$ that define a boundary envelope have the following specific properties:

They have the same number of vertices, and either polygon can be uniquely determined from the other.

Figure 4:
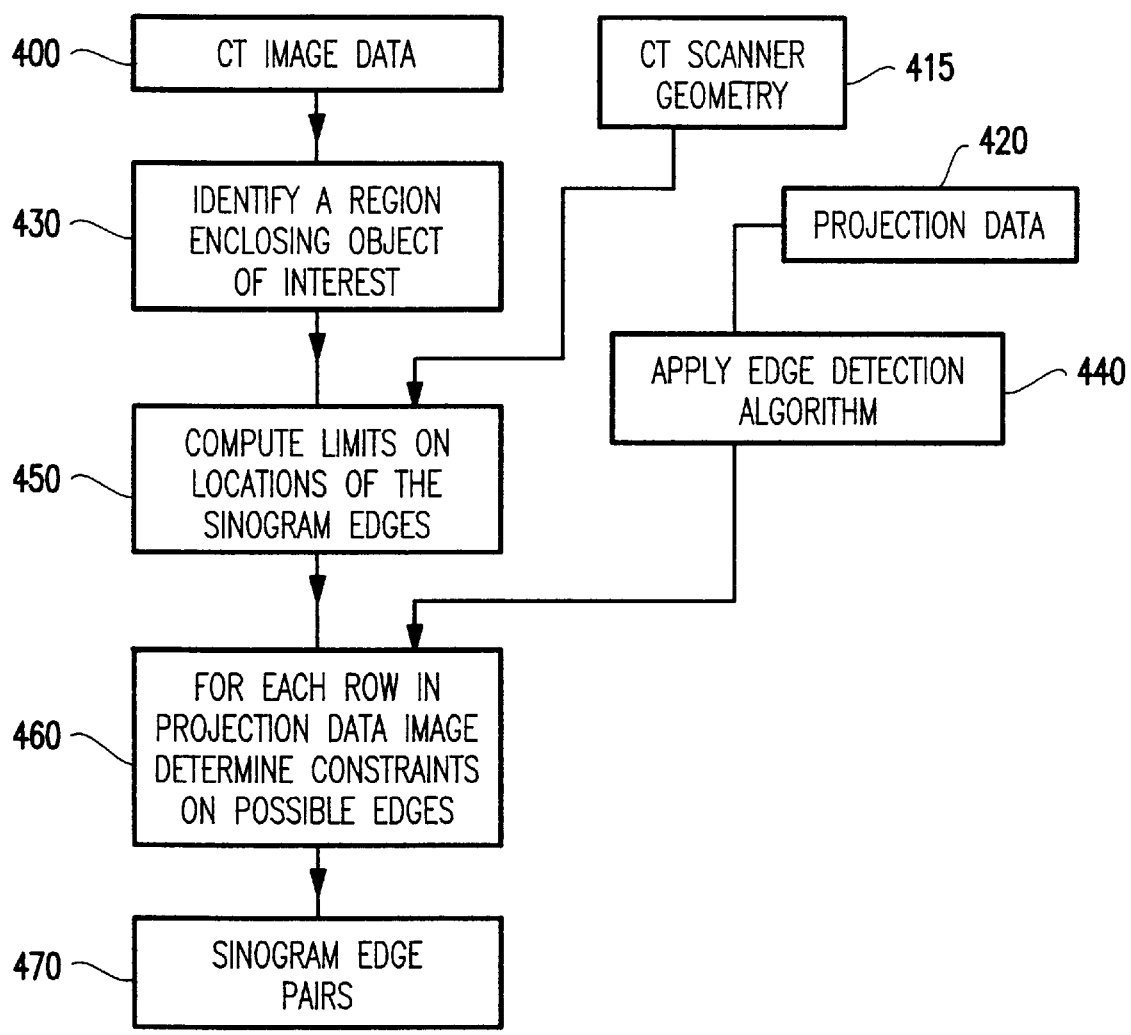
FIG. 4 is a flow chart showing the steps of extracting edge pairs from a sinogram image.

FIG. 4 is a flowchart illustrating the method of extracting the sinogram edges (function block 220 of FIG. 2). The CT image data are input at function block 400. The projection data (also referred to form a 2D image) are read in 420, and an edge-detector algorithm 440 is applied to this projection image, using prior art image processing techniques (see, for example, *Computer Vision* by Ballard and Brown, Prentice Hall, 1982). A region R is identified in process block 430 that completely encloses the object of interest in the CT image input at function block 400. In the preferred embodiment of this invention, this region is identified manually by a human operator by tracing the outline of region R on top of the CT image on the computer monitor. Now region R induces a set of constraints on the possible edge locations on the sinogram image that correspond to points of the object boundary. The limits on locations of the sinogram edges are computed in function block 450. These edge constraints can be easily derived, using prior art methods, from R and the CT scanning geometry 415. (In general, such a region R can always be identified in the type of CT image that we consider in the preferred embodiment of this invention, even though the precise location of he object boundary is corrupted by noise. In the event that the CT image is so corrupted by noise as to make it impossible to find such a region R, the method described in FIG. 4 can still applied, with steps 430 and 450 being skipped. The method will still work correctly when these two steps are skipped, since they are used primarily to speed up computation.

In function block 460, further constraints on the possible sinogram edges are computed, by making use of the facts that:

(a) the scanned object is convex; and (b) projection rays passing through the object are attenuated more (and therefore produce sinogram pixels with higher values) than rays passing through the background region immediately outside the object.

From (a), we can conclude that in each row of the sinogram, the there are exactly two edges corresponding to the object boundary, and from (b) that the image intensity gradient at the leftmost of these two edges is positive, and the image intensity gradient at the rightmost of these two edges is negative.

The constraints in function blocks 450 and 460 are used to select, from edge data computed in function block 440, the required edges pairs 470. If these constraints are not adequate on their own to uniquely identify the required edges pairs 470, a further election step is required to do this. In the preferred embodiment of this invention, an additional step is performed manually by a human operator.

Figure 5:
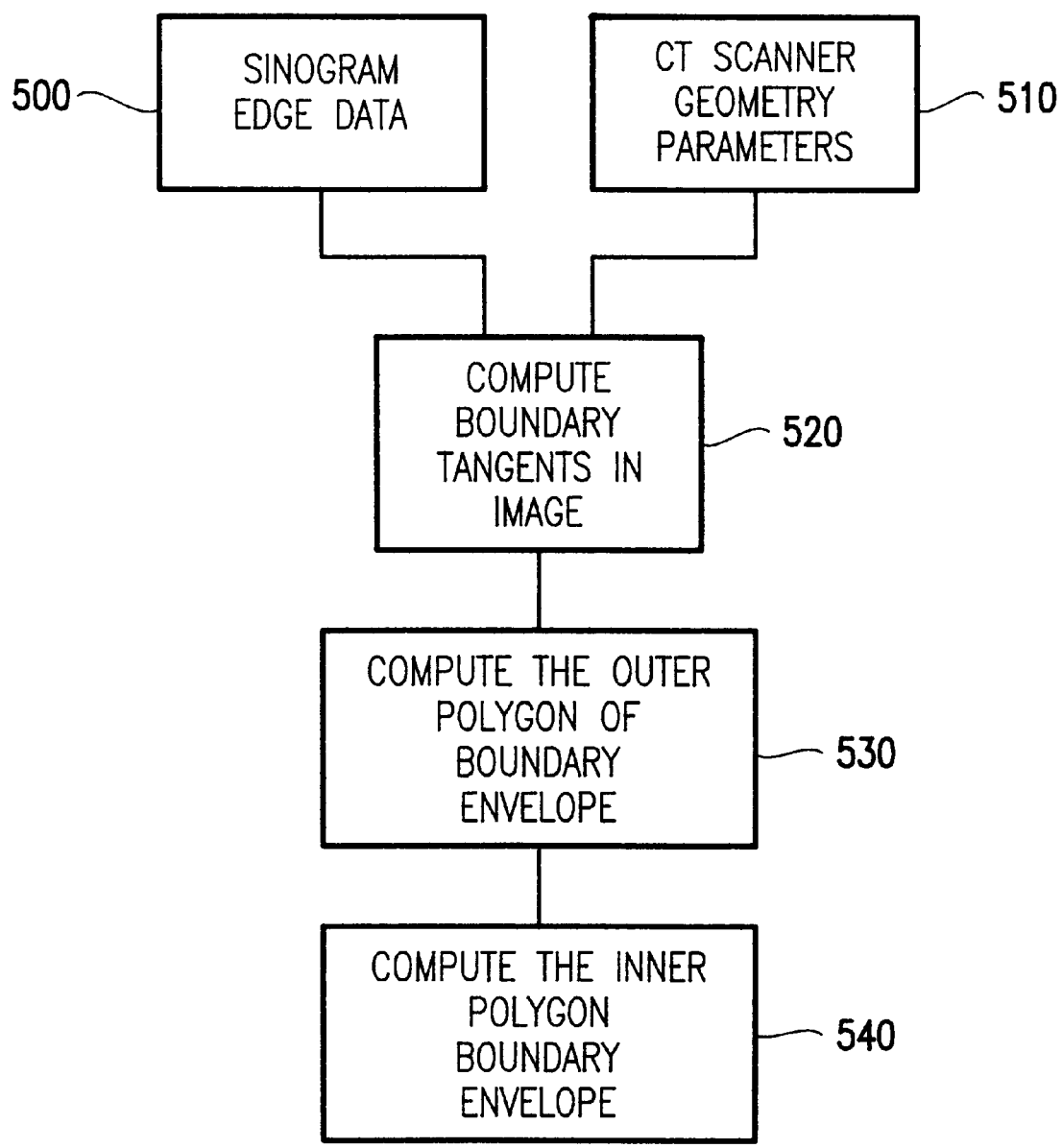
FIG. 5 is a flow chart showing the steps of deriving a boundary envelope from the sinogram edge pairs extracted by the process shown in FIG. 4.

FIG. 5 is a flowchart of the method of computing a boundary envelope from sinogram edges. The sinogram edge data 500 and the parameters of the scanning geometry 510 used as inputs to function block 520 where the boundary tangents in the image are computed.

The parameters of the scanning geometry 510 that are used in this invention are:

the CT X-ray source-to-detector distance;

the CT X-ray source-to-origin distance;

the ray geometry: (i) parallel or (ii) divergent (fan-beam);

the detector shape (for divergent ray geometry): (i) arc or (ii) planar;

number of rays per view;

spacing between successive rays;

the number of views;

the azimuth angles of the X-ray source at every view; and the rotation direction of gantry: (i) clockwise or (ii) counter-clockwise.

In the preferred embodiment of this invention:

the ray geometry is divergent;

the detector is arc-shaped;

the angular spacing between successive rays is constant; and each view has an odd number of rays, and the center-most ray intersects the detector at its center.

After the tangents corresponding to the sinogram edges are computed in function block 520, the outer polygon of the boundary envelope is computed in function block 530. In function block 540, the inner polygon of the boundary envelope is computed, completing the calculation of the boundary.

Figure 6A:
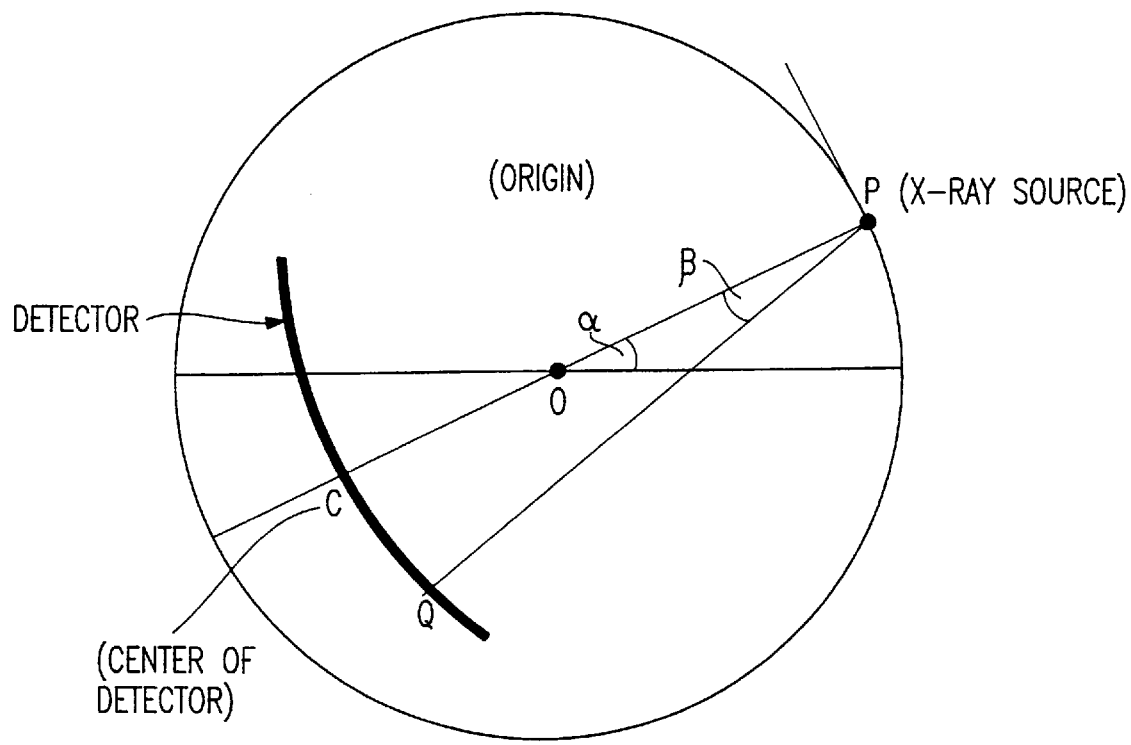
FIG. 6A is a diagram showing the scanning geometry related to computing the line PQ in the method of FIG. 6.
Figure 6:
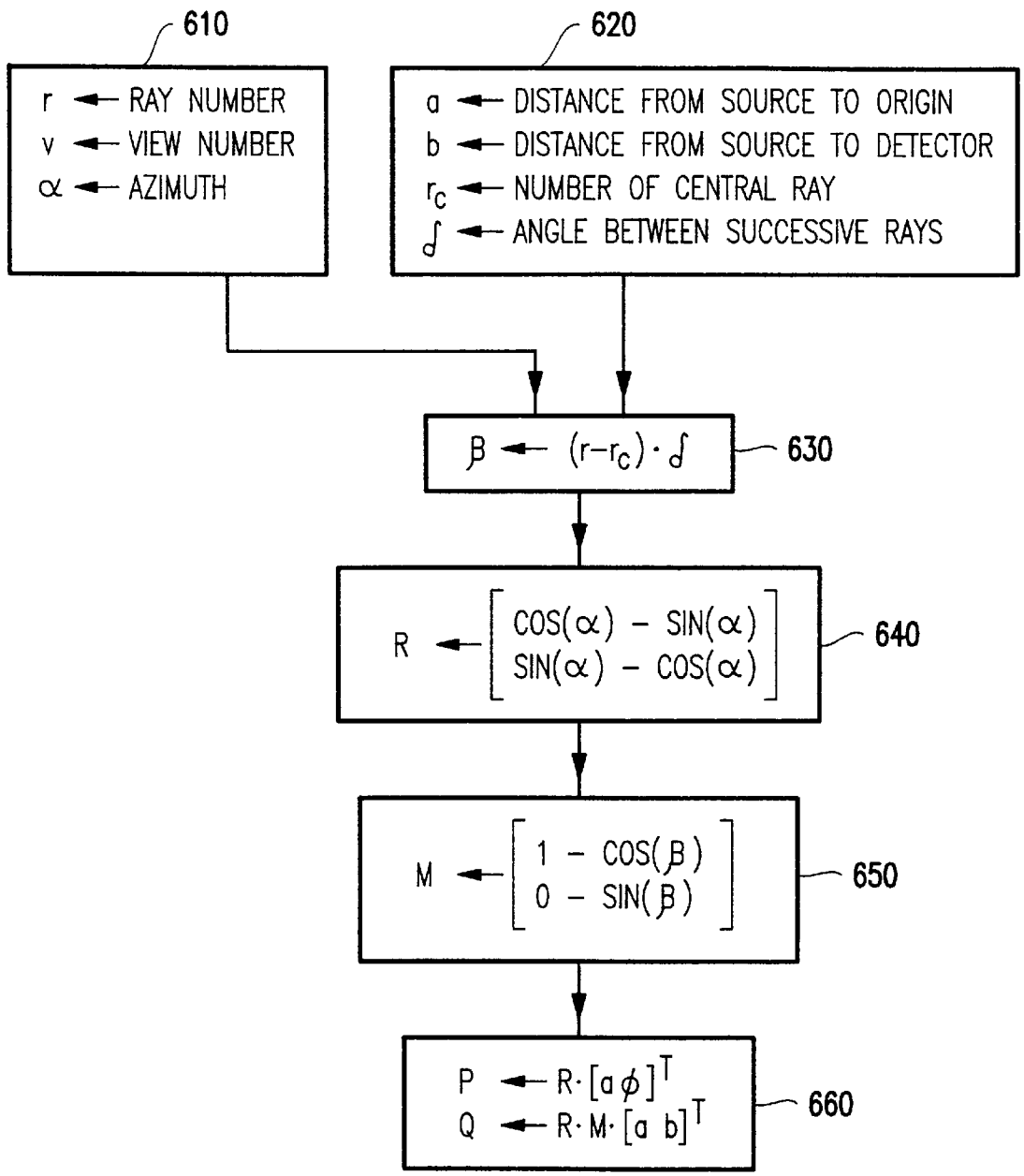
FIG. 6 is a flow chart showing the method of computing an image tangent line from a sinogram edge.

FIG. 6 describes the details of the process of function block 520 in FIG. 5. FIG. 6 is a flowchart showing the method used to derive the line segment corresponding to a given sinogram pixel. The accompanying drawing in FIG. 6A shows the scanning geometry related to computing this line segment.

The sinogram edge data is input at function block 610 and comprises:

(r,v) are the (ray,view) coordinates of the edge; and $\alpha$ is the azimuth angle of the x-ray source at view v.

The CT scanner geometry data input at function block 620 comprises:

A is to distance from X-ray source to the origin (i.e., the length of line PO in FIG. 6A);

B is to distance from X-ray source to the detector (i.e., the length of line PC in FIG. 6A);

$r_c$ is the ray number of the central ray (i.e., the ray along line PC in FIG. 6A); and $\delta$ is the angle between successive rays in the view.

In function block 630, $\beta$, the angle between lines PC and PQ in FIG. 6A, is computed. In function block 640, the 2×2 rotation matrix R is initialized. In function block 650, the 2×2 matrix M is initialized. In function block 660, the coordinates of the endpoints of line segment PQ are computed.

The sequence of process steps in function blocks 610, 620, 630, 640, 650, and 660 (FIG. 6) is applied to every sinogram edge. This completes the computation of all boundary tangents (function block 520 of FIG. 5).

The next processing step in this invention is to compute the outer polygon of the boundary envelope process block 530 of FIG. 5. FIGS. 7A to 7D illustrate the details of this process.

Figure 7A:
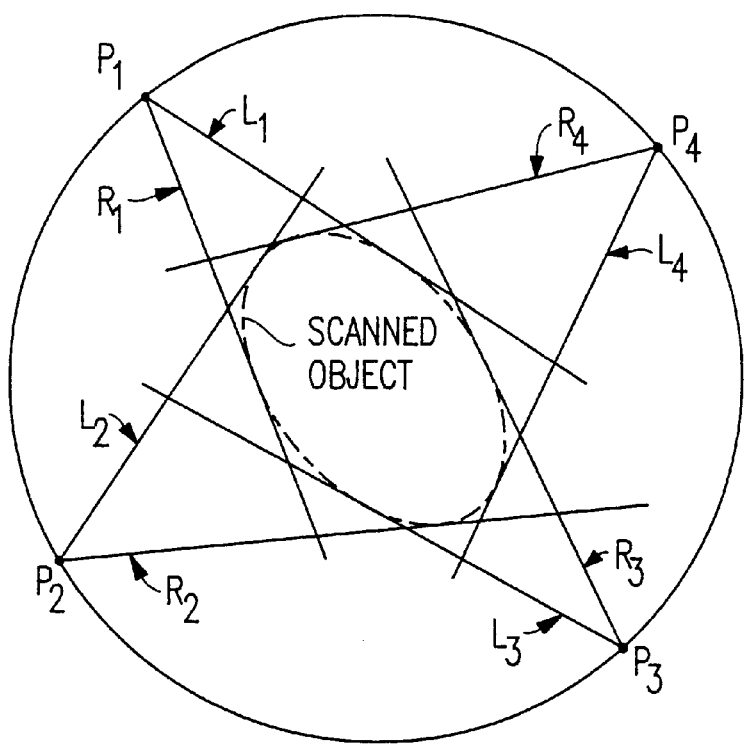
FIGS. 7A, 7B, 7C, and 7D are diagrams illustrating the process for computing the outer polygon of a boundary envelope.
Figure 7B:
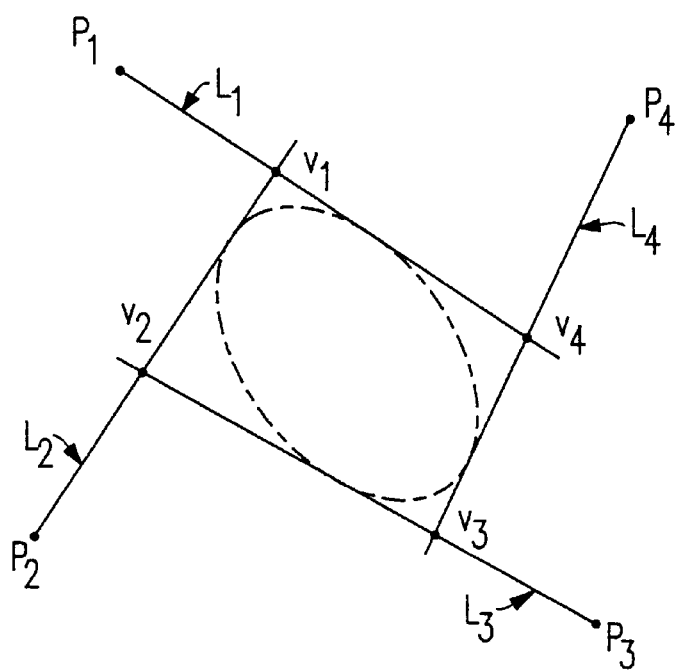
Figure 7C:
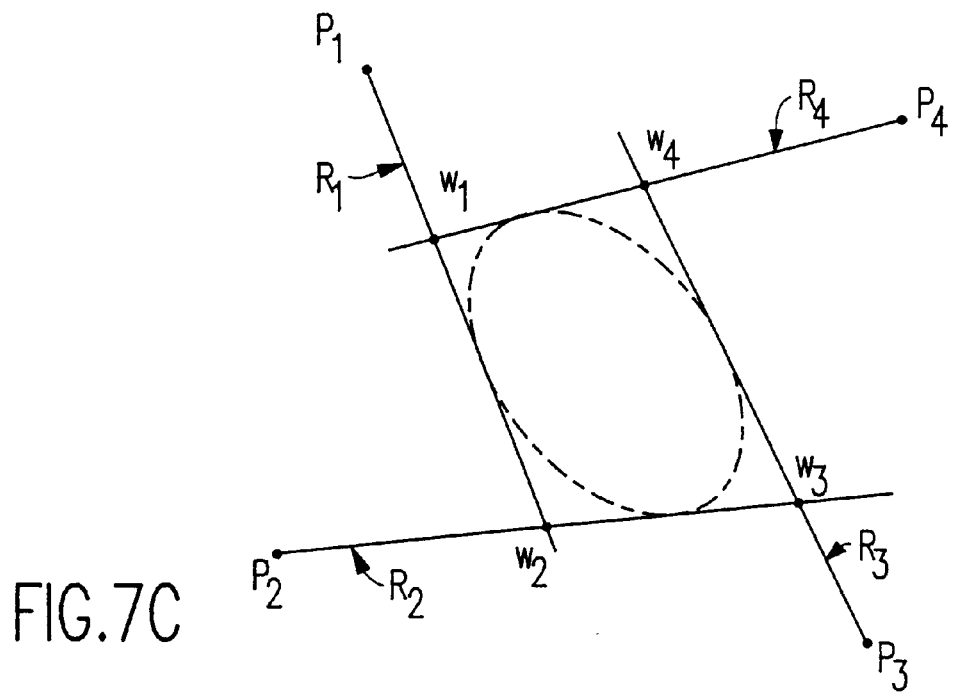

In FIG. 7A, $(L_1,R_1)$, $(L_2,R_2)$, $(L_3,R_3)$, and $(L_4,R_4)$ are four pairs of tangent lines obtained from scanning a convex object with scan views acquired at points $P_1$, $P_2$, $P_3$, $P_4$. In each pair of tangents, $L_i$ lies on the left side of the scanned object, and is called the "left tangent". Similarly, each $R_i$ is called a "right tangent". To compute the outer polygon, we first compute two intermediate polygons, polygon $P_v=(v_1, v_2, v_3, v_4)$ which is formed by the intersection of the set of left tangents (see FIG. 7B) and polygon $P_W=(W_1,W_2,W_3,W_4)$ which is formed by the intersection of the set of right tangents (see FIG. 7C).

Note that the problem of finding the convex polygon that is defined by the intersection of a set of N tangents is equivalent to the problem of finding the intersection of N half planes. In general, this problem requires a(nlog(n)) time (see for example F. Preparata and M. Sharnos, "Computational Geometry", Springer-Verlag, 1985). However, in the problem at hand, the tangents in each set are ordered. Therefore, each vertex can be computed from the intersection of pair of consecutive tangents, e.g. $v_i=L_i \cap L_{i+1}$. Therefore, the two polygons can be found in linear time.

Figure 7D:
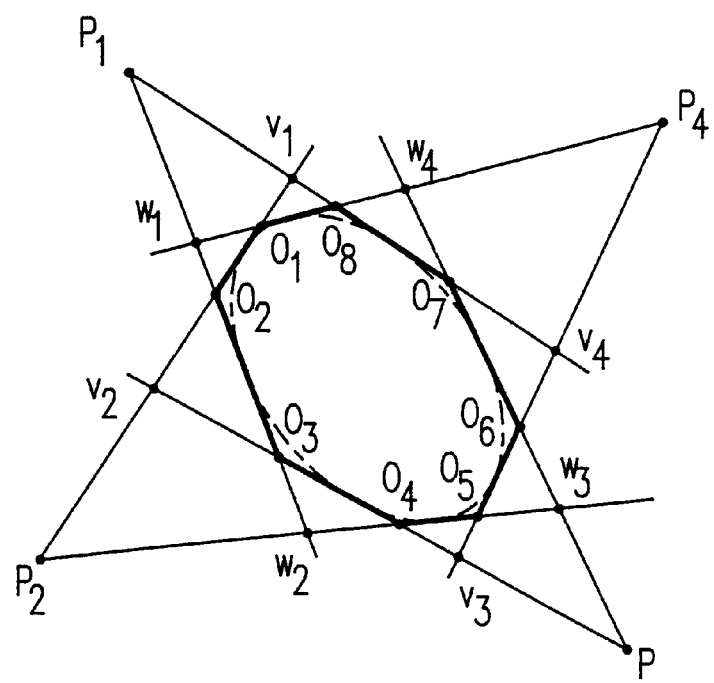

To calculate $P_{outer}=(O_1,O_2,O_3,O_4,O_5,O_6,O_7,O_8)$, the outer polygon of the boundary envelope, we now compute the intersection between polygons $P_v$ and $P_w$, as shown in FIG. 7D. This completes the processing of function block 530 of FIG. 5. Note that computing the intersection of two polygons can be done using prior art algorithms (see for example, J. O'Rourke, *Computational Geometry in C*, Cambridge University Press, 1994).

Figure 8:
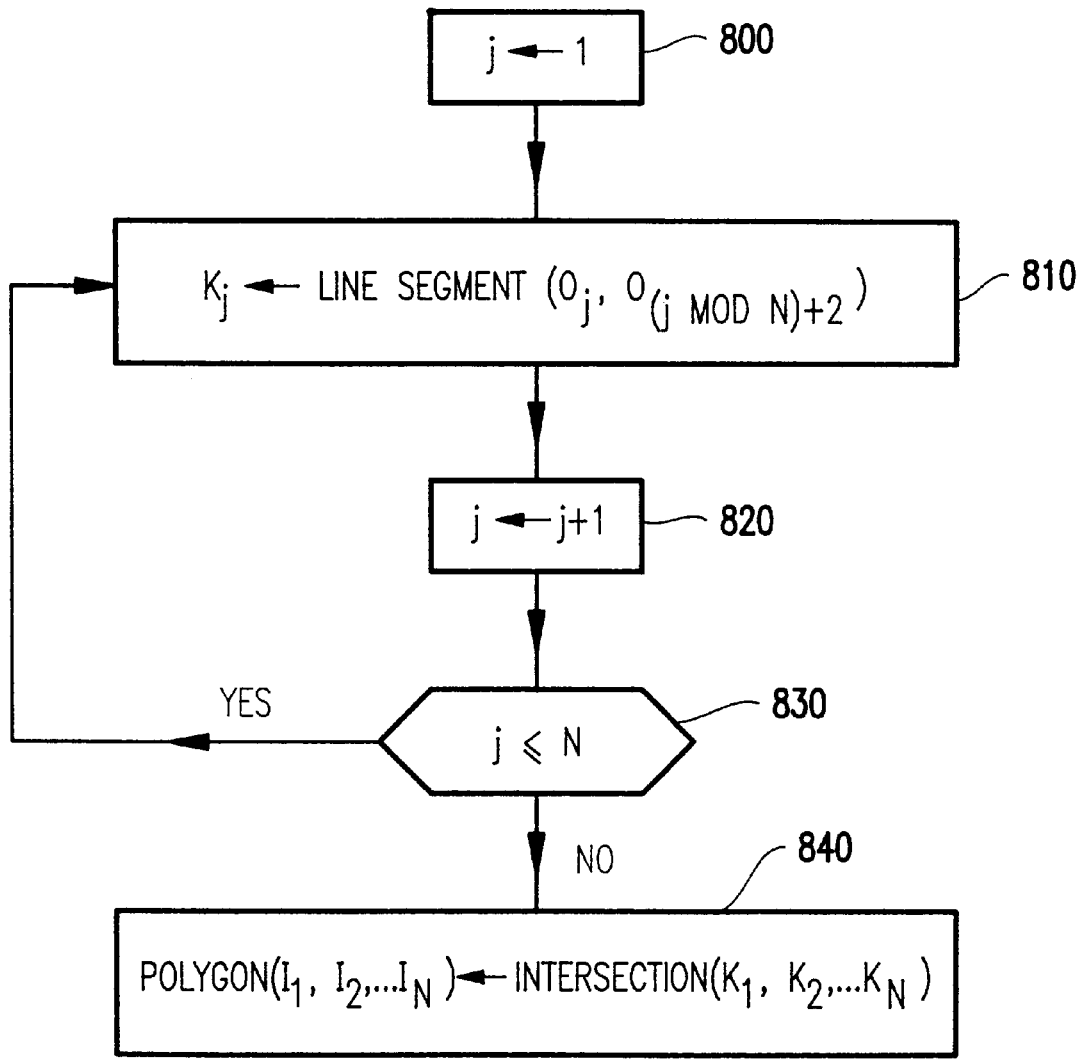
FIG. 8 is a flow chart showing the process of computing the inner polygon of a boundary envelope.

FIGS. 8 and 9A to 9C illustrate the details of calculating $P_{inner}=(I_1,I_2,I_3,I_4,I_5,I_6,I_7,I_8)$, the inner polygon of the boundary envelope (function block 540 of FIG. 5). In FIG. 8, function block 800, counter j is initialized to 1. In function block 810, $K_j$ is set to line segment $(O_j, O_{[(j\ MOD\ N)+2]}$(see FIG. 9A). In function block 820, counter j is incremented, and if its value is less than or equal to N (the number of vertices in the outer polygon) as determined in decision block 830, the process loops back to function blocks 810 and the process is repeated. When all N line segments $K_1,K_2,\ldots,K_N$, have been calculated (see FIG. 9B), and counter j is larger than N, function block 840 is executed, and inner polygon $P_{inner}=(I_1,I_2,\ldots,I_N)$ is the polygon defined by the intersection of the set of line segments $(K_1,K_2,\ldots,K_N)$ (see FIG. 9C).

Figure 9A:
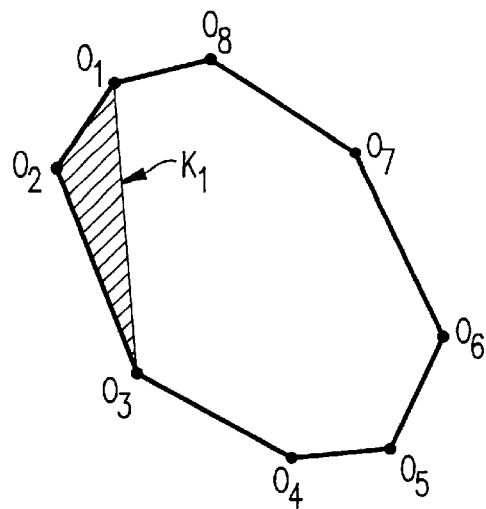
Figure 9B:
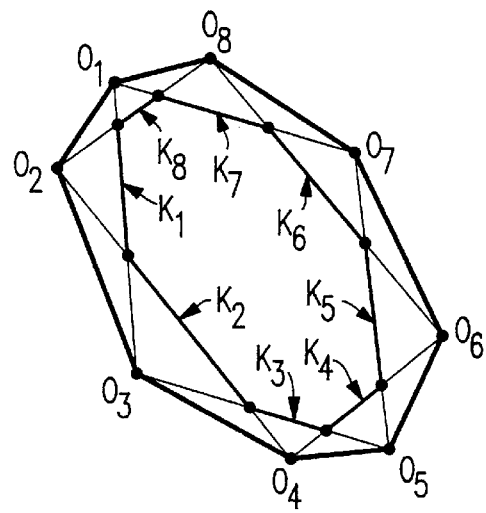
Figure 9C:
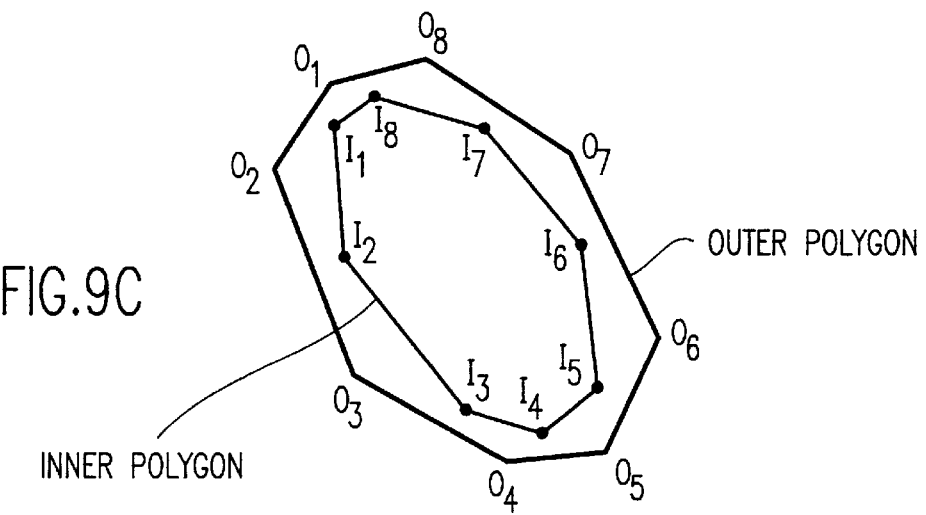

The reason that the object boundary (FIG. 9A) is guaranteed to lie strictly within the boundary envelope (FIG. 9C) is a follows. First, since the object is convex, and the edges of the outer polygon of the boundary envelope are tangent to the object, the object must lie completely inside the outer polygon. Second, consider the line segment $K_1=(O_1,O_3)$ (see FIG. 9A). We know that the object boundary must touch polygon edges $(O_1, O_2)$ and $(O_2, O_3)$. Let us call these two contact points $t_1$ and $t_2$. Since the object is convex, the portion of its boundary between $t_1$ and $t_2$ cannot cross over line segment $K_1$. Therefore, the piece of boundary segment between $t_1$ and $t_2$ is guaranteed to lie with the shaded triangular region $(O_1,O_2,O_3)$. By repeating this argument for every triple of successive outer polygon edges $(O_1, O_{(j\ MOD\ N)+1}, O_{(j\ MOD\ N)+2}$, we see that the object boundary is guaranteed to lie outside the region defined by the intersection of line segments $K_1,K_2,\ldots,K_N$ (FIG. 9B). Therefore, the object boundary is guaranteed to lie:

inside polygon $P_{inner}=(I_1,I_2,\ldots,O_N)$, and outside polygon $P_{outer}=(O_1,O_2,\ldots,O_N)$ In other words the object is guaranteed to lie within the boundary envelope $(P_{inner}, P_{outer})$ (FIG. 9C).

The boundary envelope of an object can be used for both qualitative and quantitative evaluation of the physical properties of a convex object in a noisy CT image.

Figure 10:
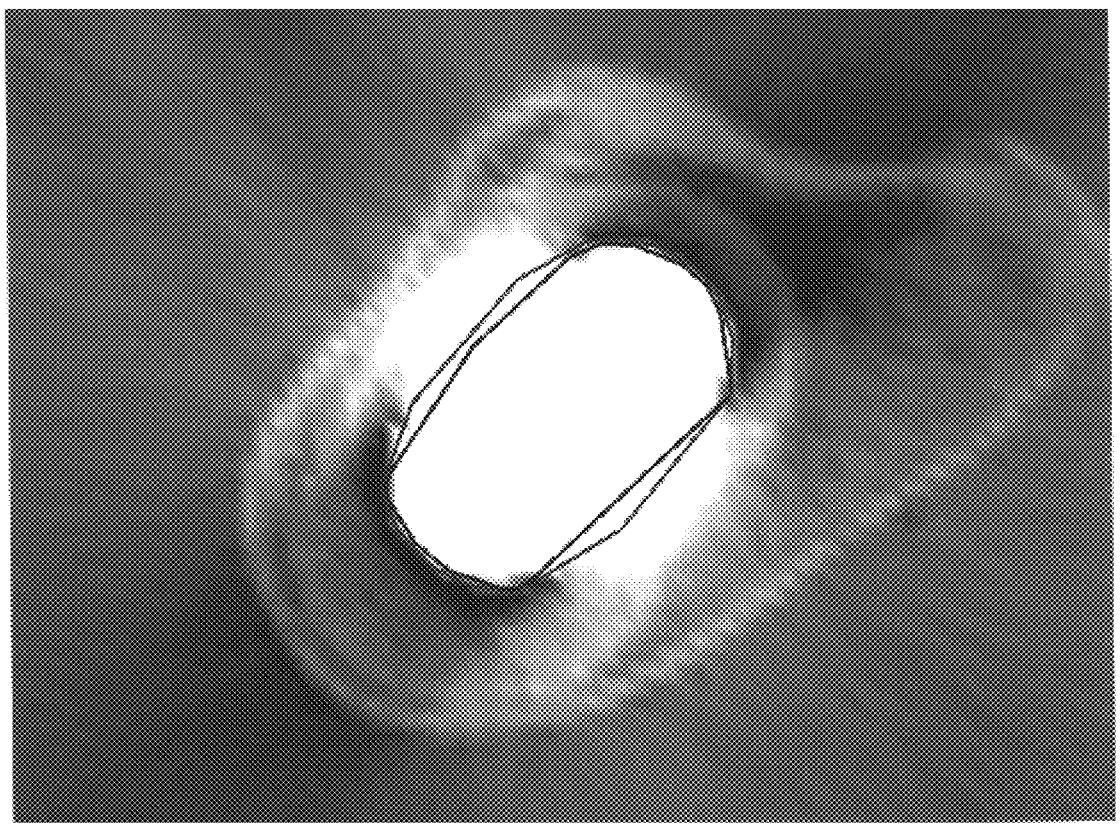
FIG. 10 is a photographic image which illustrates the superimposition of a boundary envelope on a noisy CT image.

In the preferred embodiment of this invention, qualitative evaluation is achieved by displaying on a computer monitor the noisy CT image, together with a graphical overlay of the boundary envelope (FIG. 10). The physician (or other human observer) can then visually integrate the information presented by the boundary envelope together with the CT image, in order to make more accurate clinical judgments than would be possible from observing the just the noisy CT image itself.

Since the boundary envelope has a precise mathematical definition, it can also be used to quantitatively evaluate properties of objects and their boundaries. In the preferred embodiment of this invention, these include using the inner and outer polygons to calculate bounds on an object's surface area, boundary perimeter, centroid position, moments, and products of inertia, eccentricity, etc.

Given this disclosure, alternative equivalent embodiments will become apparent to those skilled in the art. These embodiments are also within the contemplation of the invention. Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer system for processing computed tomography (CT) data, comprising:
   a computer with a memory, a central processing unit (CPU), and a display monitor;
   a data structure resident in said memory containing a CT image corrupted by noise;
   a data structure resident in said memory containing projection data from which the CT image has been reconstructed;
   a process executed by the CPU that restores noise-corrupted boundary information for convex objects within the CT image based on said projection data, said process including:
     (a) means for detecting sinogram edges based on said projection data;
     (b) means for computing a boundary envelope based on said sinogram edges by computing a first polygon and computing a second polygon surrounding said first polygon, wherein locations of said first and second polygons are computed so as to ensure that said boundary information lies between said first and second polygons;
     (c) means for restoring said noise-corrupted boundary information based on the boundary envelope computed in said computing step;
   a process executed by the CPU for displaying the restored information on a computer monitor; and
   a process executed by the CPU for computing properties of noise-corrupted objects appearing in the image from the restored boundary information.

2. A method for processing computed tomography (CT) data, comprising:
   obtaining a computer tomography image of an object;
   obtaining projection data derived from a scanner scanning said object; and
   restoring noise-corrupted boundary information within said image based on said projection data, said restoring step including:
     detecting sinogram edges based on said projection data;
     computing a boundary envelope based on said sinogram edges; and
     restoring said noise-corrupted boundary information based on the boundary envelope computed in said computing step, and
   wherein said step of computing the boundary envelope includes:
     computing a first polygon;
     computing a second polygon surrounded by said first polygon; and
     wherein locations of said first and second polygons are computed so as to ensure that said boundary information lies between said first and second polygons.

3. The method of claim 2, further comprising:
   displaying the restored boundary information on a display.

4. The method of claim 2, further comprising:
   determining at least one numerical property of said image object based on the restored boundary information.

5. The method of claim 2, wherein each of said sinogram edges corresponds to a line in said image that is tangent to an object boundary.

6. The method of claim 5, wherein said computing step includes:
   computing said tangent based on parameters of a scanning geometry of said scanner.

7. The method of claim 5, wherein said first and second polygons have a same number of vertices.

8. The method of claim 2, wherein said first polygon is computed in accordance with steps that include:
   defining a predetermined number of points around said object within said image;
   computing a plurality of pairs of lines tangent to said object, each of said pairs of lines originating from a respective one of said points, each of said pairs of lines further including a first line which is on a left side of said object and a second line which is on a right side of said object; and
   forming said first polygon from said plurality of pairs of lines.

9. The method of claim 8, where said forming step includes:
   forming a first intermediate polygon from intersections of the first lines in each of said pairs of lines;
   forming a second intermediate polygon from intersections of the second lines in each of said pairs of lines; and
   forming said first polygon based on an intersection of said first intermediate polygon and said second intermediate polygon.

10. The method of claim 2, wherein said second polygon is computed from said first polygon.

11. The method of claim 10, wherein said second polygon is computed in accordance with steps that include:
   computing a number of line segments equal to a number of vertices of said first polygon, said line segments connecting successive pairs of vertices each of which are separated by one vertex;
   determining points of intersection of said line segments; and
   forming said second polygon based on said points of intersection of said line segments.

12. A method for processing computed tomography (CT) data, comprising:
   obtaining a computer tomography image of an object, said object having boundary information which is at least partially missing as a result of noise;

obtaining projection data derived from a scanner scanning said object;

computing a boundary envelope in said image based on said projection data, said boundary envelope including an outer polygon enclosing an inner polygon, wherein said inner and outer polygons are computed to ensure that said boundary information lies within a region defined between said inner and outer polygons; and restoring said boundary information based on said boundary envelope.

13. The method of claim 12, wherein said inner polygon and said outer polygon have a same number of vertices.

14. The method of claim 12, wherein said outer polygon is computed in accordance with steps that include:

defining a predetermined number of points around said object within said image;

computing a plurality of pairs of lines tangent to said object, each of said pairs of lines originating from a respective one of said points, each of said pairs of lines further including a first line which is on a left side of said object and a second line which is on a right side of said object; and forming said outer polygon from said plurality of pairs of lines.

15. The method of claim 12, where said forming step includes:

forming a first intermediate polygon from intersections of the first lines in each of said pairs of lines;

forming a second intermediate polygon from intersections of the second lines in each of said pairs of lines; and forming said outer polygon based on an intersection of said first intermediate polygon and said second intermediate polygon.

16. The method of claim 12, wherein said inner polygon is computed from said first polygon.

17. The method of claim 16, wherein said inner polygon is computed in accordance with steps that include:

computing a number of line segments equal to a number of vertices of said first polygon, said line segments connecting successive pairs of vertices each of which are separated by one vertex;

determining points of intersection of said line segments; and forming said inner polygon based on said points of intersection of said line segments.

18. The method of claim 12, further comprising:

displaying the restored boundary information.

19. The method of claim 12, further comprising:

detecting sinogram edges based on said projection data; and computing said boundary envelope based on said sinogram edges.

20. The method of claim 19, wherein said sinogram edges correspond to a line in said image that is tangent to an object boundary.

21. The method of claim 20, further comprising:

computing said tangent based on parameters of a scanning geometry of said scanner.

22. A system for processing computed tomography (CT) data, comprising:

a scanner which obtains a CT image of an object and projection data derived from the scanner scanning said object, said object having boundary information which is at least partially missing as a result of noise; and a processor which computes a boundary envelope in said image based on said projection data, said boundary envelope including an outer polygon enclosing an inner polygon, wherein said inner and outer polygons are computed to ensure that said boundary information lies within a region defined between said inner and outer polygons, said processor restoring said boundary information based on said boundary envelope.

23. The system of claim 22, further comprising:

a computer monitor which displays said restored boundary information.

* * * * *